Patented Sept. 1, 1925.

1,551,616

UNITED STATES PATENT OFFICE.

CHARLES E. PARSONS, OF NEW YORK, N. Y., AND SAMUEL PEACOCK, OF WHEELING, WEST VIRGINIA, ASSIGNORS TO METAL RESEARCH CORPORATION, OF NEW YORK, N. Y., A CORPORATION OF DELAWARE.

PROCESS OF TREATING BLAST-FURNACE SLAG.

No Drawing. Application filed January 2, 1925. Serial No. 273.

*To all whom it may concern:*

Be it known that we, CHARLES E. PARSONS, a citizen of the United States, residing at New York, in the county of New York and State of New York, and SAMUEL PEACOCK, a citizen of the United States, residing at Wheeling, in the county of Ohio and State of West Virginia, have invented certain new and useful Improvements in Processes of Treating Blast-Furnace Slag; and we do hereby declare the following to be a full, clear, and exact description of the invention, such as will enable others skilled in the art to which it appertains to make and use the same.

This invention relates to a process for desulphurizing the basic slags of blast furnaces and has for its object to accomplish the same in an expeditious and economical manner.

With this object in view, the invention consists in the novel combinations of steps more fully hereinafter disclosed and particularly pointed out in the claims.

It is well known that the basic slags of blast furnaces are usually considered of little commercial value although they contain from 12% to 15% of alumina and from say 60% to 70% of calcium and magnesium silicates which would be of great value to the manufacture of glass if free from sulphides. But, unfortunately, this said basic slag contains from say 2% to 3% of sulphur in the form of calcium sulphide, and the removal of this sulphur, which is commonly done through its oxidation to sulphuric acid, constitutes a costly industrial procedure.

It has been found, by careful investigation, that when insoluble calcium sulphide of the form commonly found in the basic slags of blast furnaces is heated in water to about 150° C., it is changed to the soluble hydrosulphide. The reaction may be stated thus:—

$$2CaS + H_2O = Ca(HS)_2 + CaO.$$

It will thus be seen that after the reaction above, the soluble calcium hydrosulphide $Ca(HS)_2$ is found in a dissolved condition. By suitable filtration and washing one next effectually removes said hydrosulphide from the slag, which latter then becomes available for digestion with suitable sodium salts for the removal of the combined aluminum present.

Accordingly, one next treats the slag residue with sodium hydroxide, NaOH, and the combined aluminum present in the slag is extracted in accordance with the following equation:

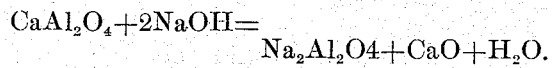
$$CaAl_2O_4 + 2NaOH = Na_2Al_2O_4 + CaO + H_2O.$$

After the combined aluminum has thus been formed, it being soluble in water, it is separated out, as by filtration, and the residue consisting of the silicates of calcium and magnesium being already in a state of combination, are useful for glass making purposes without further treatment.

In removing the sulphide, it is very desirable that the slag be ground to a fineness of at least 80 mesh and a still finer sub-division further facilitates the reaction. It is preferred to treat the ground slag in an autoclave at a pressure above 150 lbs. and preferably at about 200 lbs. pressure. For this purpose it is desirable to employ a rotating cylinder type of autoclave provided with the well known baffles to break the continuity of the solid matter.

It will thus be seen that by the above procedure, the basic slags from blast furnaces are desulphurized by converting the calcium sulphide present to the soluble calcium hydrosulphide form which latter is readily dissolved out leaving a residue consisting largely of calcium and magnesium silicates and calcium aluminate which is treated with a sodium salt to recover the combined aluminum present in the form of a sodium aluminate. Of course, there are or may be small percentages of iron and other impurities present, but they are found to not be in sufficient quantities to prevent the use of the residue for glass making purposes.

What is claimed is:—

1. The process of treating for glass making purposes a basic blast furnace slag containing combined sulphur, aluminum, calcium, and magnesium, which consists in converting the calcium sulphide present into the hydro-sulphide form; separating out the calcium hydro-sulphide thus produced; treating the residue with a sodium salt to form a soluble sodium aluminate with the aluminum present; separating out said aluminate; and recovering the desired calcium and magnesium silicate residue.

2. The process of treating for glass making purposes a basic blast furnace slag containing combined sulphur, aluminum, calcium, and magnesium, which consists in converting the calcium sulphide present into the hydro-sulphide form by treating said slag with steam under a pressure above 150 pounds; separating out the soluble calcium hydrosulphide thus produced; treating the residue with sodium hydroxide to form a soluble sodium aluminate with the aluminum present; separating out said aluminate; and recovering the desired calcium and magnesium silicate residue.

In testimony whereof we affix our signatures.

CHARLES E. PARSONS.
SAMUEL PEACOCK.